United States Patent [19]
Manabe et al.

[11] Patent Number: 5,178,735
[45] Date of Patent: Jan. 12, 1993

[54] PROCESS FOR THE SUPERCRITICAL EXTRACTION AND SEPARATION OF SOLID SAMPLES

[75] Inventors: Akiyoshi Manabe, Fujisawa; Tetsuro Yamashita; Katsuhisa Harada, both of Tokyo; Tsuneo Tokumori, Kurashiki; Yoko Sumida, Okayama, all of Japan

[73] Assignee: Chlorine Engineers, Tokyo, Japan

[21] Appl. No.: 462,288

[22] Filed: Dec. 28, 1989

Related U.S. Application Data

[63] Continuation of Ser. No. 235,310, Aug. 23, 1988, abandoned.

[30] Foreign Application Priority Data

Sep. 7, 1987 [JP] Japan .................................. 62-222022

[51] Int. Cl.[5] .......................... B01D 3/34; B01D 11/02; A61K 35/78
[52] U.S. Cl. ........................................ 203/49; 203/56; 203/63; 210/634; 424/195.1
[58] Field of Search .............................. 203/49, 56, 63; 426/425, 427, 489, 490, 495; 424/195.1; 210/634

[56] References Cited

U.S. PATENT DOCUMENTS

| | | | |
|---|---|---|---|
| 3,879,569 | 4/1975 | Vitzthum et al. | 426/427 |
| 4,322,445 | 3/1982 | Peter et al. | 426/427 |
| 4,345,976 | 8/1982 | Peter et al. | 203/49 |
| 4,601,906 | 7/1986 | Shindler | 426/425 |
| 4,714,526 | 12/1987 | Pennisi et al. | 203/49 |
| 4,714,617 | 12/1987 | Gahrs | 203/49 |
| 4,737,332 | 4/1988 | Miyashita et al. | 264/233 |
| 4,744,926 | 5/1988 | Rice | 203/49 |

OTHER PUBLICATIONS

Chemical Abstr, vol. 78, No. 21 (1973), p. 169:133641s Schwabe et al, Recovery of Vasoactive drugs from leaves of ginkobiloba.
Chem. Abst., vol. 78, No. 8, (1973) p. 277:47787n, Kloss et al Vasoactive drugs from Ginkgo biloba leaves.
Chem. Abstr., vol. 86, No. 13, (1977), p. 121:84564y Van Staden, Extraction and Recovery of cytokinin glucosides.

*Primary Examiner*—Wilbur Bascomb, Jr.
*Attorney, Agent, or Firm*—Kuhn and Muller

[57] ABSTRACT

A method of extracting and separating substances contained in a solid sample, especially from ginkgo leaves, which comprises introducing a supercritical fluid into a dispersion in which the solid sample is dispersed, separating the supercritical fluid containing dissolved substances to be extracted.

13 Claims, 1 Drawing Sheet

PROCESS FOR THE SUPERCRITICAL EXTRACTION AND SEPARATION OF SOLID SAMPLES

This application is a continuation of application Ser. No. 235,310 filed Aug. 23, 1988 and now abandoned.

BACKGROUND OF THE INVENTION

The present invention relates to an extraction process utilizing a fluid in supercritical state. In particular, it relates to a process for removing undesirable substances from an extract of ginkgo leaves and at the same time enhancing the concentration of effective components contained therein.

DESCRIPTION OF THE PRIOR ART

For the extraction of effective components or removal of harmful components from, e.g., naturally occurring materials, there has been employed steam distillation or solvent extraction utilizing such solvents as esters, hydrocarbons, halogenated hydrocarbons, or the like.

There are, however, cases where the use of organic solvents is restricted. For example, in cases where extracts from naturally occurring materials are to be used for foods or medical purposes, organic solvents may not be employed for their extraction, or extracts obtained must be subjected to aftertreatment in order to reduce the quantity of organic solvents remaining therein.

In view of the above, extraction processes utilizing supercritical carbon dioxide have been employed in U.S. Pat. No. 3,879,569 ("Extraction of Caffeine from Coffee") and in U.S. Pat. No. 4,167,589 ("Production of Caffein-free Tea Extracts").

The present inventors have conducted intensive investigations with the purpose of applying extraction with a supercritical fluid, in particular, carbon dioxide (which is safe enough to be permitted as a food additive) to the extraction and purification of effective components contained in ginkgo leaves, and have accomplished the present invention.

Ginkgo is a deciduous tree of which original habitat is China. Giant ginkgo trees are seen in many places. Ginkgo is known as one of the oldest plants which are found in fossils and still exist. Ginkgo trees are strongly resistant to blight and noxious insects. The trees contain various useful substances, and the kernel (albumen and embryo) of ginkgo seeds has been utilized as food from the ancient time.

In particular, leaves of ginkgo contain vaso-active substances capable of expanding capillary, and such substances have hitherto been extracted and purified with organic solvents.

In addition to such effective components as flavonoids, gingko leaves contain ginkgoic acid, bilobol, etc. (these components are present mainly in external seed coat). However, ginkgoic acid, bilobol, ginkgol, etc. have a tendency to cause allergy to some people. It is therefore necessary to reduce the quantities of these substances contained in extracts from ginkgo leaves.

In Japanese Patent Publication No. 28,091/71 (Patent Family is DE(B) No. 1767098) is described a process wherein ginkgo leaves are extracted at ca. 40 to 100° C. with a water containing organic solvent miscible with water, and the extract is then extracted with a lipophilic solvent immisible with water (e.g., carbon tetrachloride), followed by the evaporation of the lipophilic solvent from the water-containing organic extract.

In Japanese Patent Publication No. 27,323/74 (Patent Family is DE(B) NO. 2117429) is disclosed a process in which ammonium sulfate is added to a water-containing organic extract obtained in accordance with the process described in Japanese Patent Publication No. 28,091/71, the resulting mixture is extracted with methyl ethyl ketone, a lead compound is added to the extract, precipitates formed are removed off, and then the supernatant is extracted with an organic solvent.

In the above-described processes for extracting effective components from ginkgo leaves, there is used an organic halogenaide (e.g., carbon tetrachloride) or methyl ethyl ketone. In case where they are to be used for medical purposes, an additional step is required in order not to allow the organic solvents to remain in the final products. However, in cases where they are to be used for health foods, the above-described extraction and purification processes could not be utilized for their production since it is not allowed to use organic solvents in any of steps for producing health foods.

SUMMARY OF THE INVENTION

The inventors have attempted to utilize supercritical carbon dioxide for the purification of effective components contained in powdery extracts obtained by extracting ginkgo leaves with ethanol and then removing the ethanol by evaporation. It was however not possible to remove harmful components at a sufficient rate even when a small quantity of an organic solvent (e.g., ethanol) was added as an entrainer to the supercritical fluid.

In view of the above results, various processes have been investigated for the purpose of enhancement of extraction efficiency. As a result, it has now been found that the concentration of effective components can be enhanced and at the same time the concentration of harmful substances can be reduced by (i) admixing powdery extracts from ginkgo leaves with ethanol in a ratio where a dispersion is formed and then (ii) introducing supercritical carbon dioxide into the dispersion.

In other words, when a fluid which is in supercritical state is introduced into a dispersion of a solid sample (such as powdery extracts from ginkgo leaves) in an organic solvent, satisfactory results can be obtained even in the case of a solid sample which could hardly be extracted with a good extraction rate by ordinary extraction procedure.

In the extraction process of the invention, ethanol can be added, as an entrainer, to supercritical carbon dioxide so that the state of the dispersion could be maintained as constant as possible.

The powders of extracts from ginkgo leaves can be prepared by extracting ginkgo leaves with ethanol and then removing the solvent therefrom. The powder does not easily dissolve in ethanol. They dissolve in ethanol only in part and the solvent and the powders form a mixture in which the powders are in a dispersed state. In the Present invention, such a mixture is referred to as dispersion.

After the extraction procedure has been completed, the ethanol used to disperse the powders can be removed by introducing supercritical carbon dioxide without any trace of ethanol into the dispersion.

In the process of the present invention, there can be used various kinds of supercritical fluids and organic solvents. It can however be preferable for reason of safety to use carbon dioxide and ethanol in cases where the extracts are to be used for foods.

DETAILED DESCRIPTION OF THE INVENTION

Figure 1:
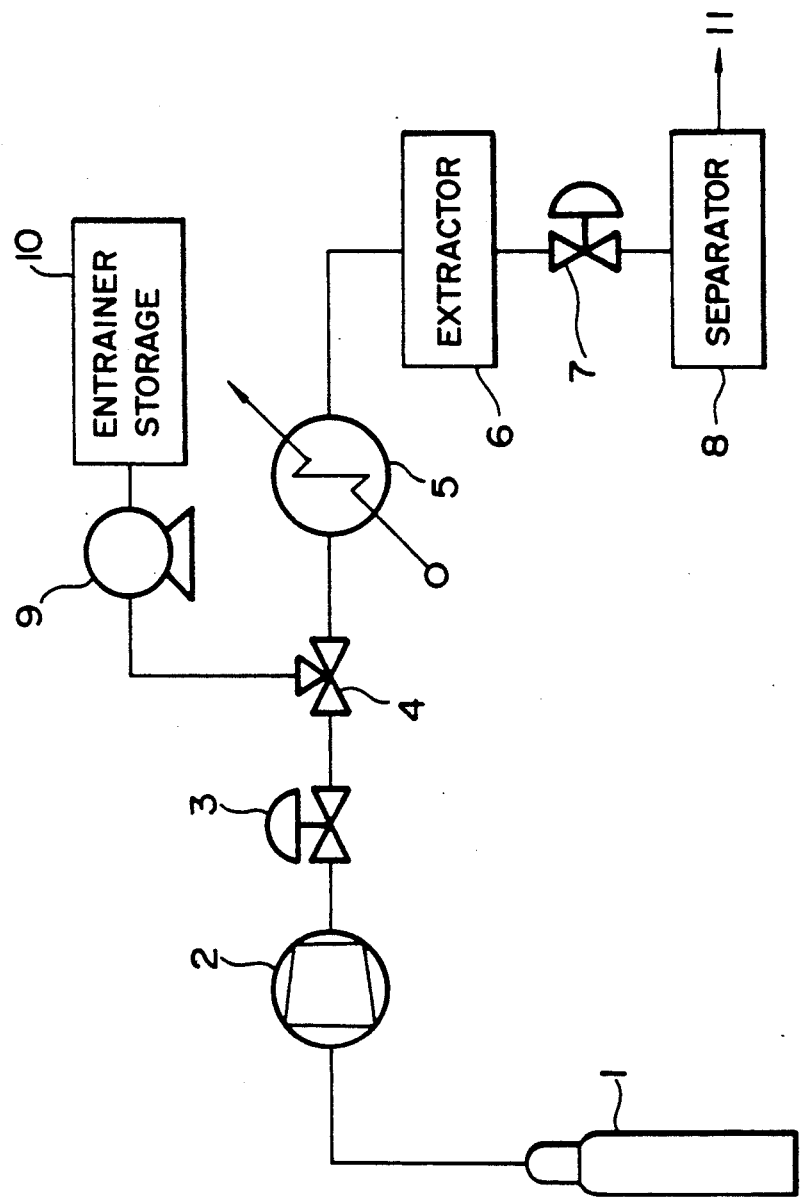
FIG. 1 is a flow sheet of an extraction and separation process according to the present invention.

With the above-described constitution, the extraction of the invention is carried out by using supercritical carbon dioxide and without using organic solvents which can be harmful if contained in foods or which could hardly be removed off without difficulty. Accordingly, the process can be of high safety and required only a simple aftertreatment.

In addition, enhanced extraction rates can be attained even in the case of solid samples which could not be extracted with good results by a simple supercritical extraction.

The present invention will further be explained with reference to the accompanying drawing.

Solid materials in powder or particulate form to be treated in accordance with the invention, such as the crude powders obtained by extracting ginkgo leaves with ethanol, are mixed with a suitable dispersing agent such as ethanol in an amount sufficient to form a dispersion of said the solid material prior to the treatment thereof in the extractor 6.

Carbon dioxide is supplied from bomb 1 to compressor 2. After being compressed by the compressor, carbon dioxide flow, via pressure control valve 3 and three-way valve 4, to heat exchanger 5 where it is heated to a predetermined temperature.

The supercritical fluid heated to predetermined temperature by the heat exchanger is supplied to the dispersion in extractor 6, and the supercritical fluid flowing out of the extraction tank is decompressed at pressure reducing valve 7 and then supplied to conventional separator 8.

If necessary, entrainer from entrainer storage 10 is pumped by high pressure injection pump 9 through three-way valve 4 into the supercritical fluid.

Carbon dioxide is separated from extracted substances in separator 8 and then released into the atmosphere as shown at 11 or recycled.

EXAMPLE 1

There was prepared a dispersion by admixing 15 ml of ethanol with 1 g crude powders, which was obtained by extracting ginkgo leaves with ethanol and in which were contained 2.8% by weight of effective components and 2.0% by weight of harmful components. The dispersion was subjected to extraction using an extraction system as shown in FIG. 1. Supercritical carbon dioxide having a pressure of 400 kg/cm$^2$ at 70° C. and containing 9% by weight of ethanol was supplied for 30 minutes, whereby the flow rate of carbon dioxide flowing out of the outlet of the separator was adjusted to 3/min.

Thereafter, supercritical carbon dioxide not containing ethanol was supplied to the system in order to remove ethanol contained in the dispersion, and the pressure in the extractor was reduced so as to take out the extraction residue.

The quantities of kaempferol and quercetion (effective components) contained in the residue were determined by high performance liquid chromatography, and the quantities of ginkgoic acid and bilobol (harmful substances) were determined by gas chromatography (GC) and GC-mass spectrometry.

In the thus obtained residue were contained 3.8% by weight of effective components and 0.04% by weight of harmful components.

The extraction procedure was repeated in the same manner as above, except that the quantity of ethanol added to carbon dioxide was increased to 20% or 40% by weight. The contents of effective and harmful components contained in the residues showed no substantial differences, and the weight of the residues decreased.

COMPARATIVE EXAMPLE 1

One gram of powders of the same sample was placed in the extractor of the same extraction system as the one used in Example 1 and subjected to the same extraction treatment under the same conditions.

The resulting extraction residue contained 1.96% by weight of harmful components.

COMPARATIVE EXAMPLES 2

The extraction procedure was repeated in the same manner as in Comparative Example 1, except that 0.5% or 2% by weight of ethanol was added as an entrainer to carbon dioxide. The resulting residues contained harmful components in an amount of 1.8% or 2% by weight, respectively.

What is claimed is:

1. A process for extracting substances contained in a solid sample, which comprises:
   a. Preparing a dispersion f a solid sample to be treated in an organic dispersion fluid, said solid sample being an extract derived from ginkgo leaves.
   b. extracting undesirable components from said dispersion of solid sample by treating said dispersion of solid sample in an extractor with a fluid in a supercritical state together with an entrainer fluid while maintaining said solid sample in a dispersed state for a time necessary to obtain the desired extraction of substances from said solid sample;
   c. continuously recovering said fluid in a supercritical state containing dissolved undesirable substances from said extractor while treating said dispersion of solid sample in said extractor as provided in step b; and
   d. recovering said solid sample from said extractor after completion of the extraction treatment thereof.

2. The process as defined in claim 1, wherein recovering said solid sample from said extractor after the extraction treatment thereof, process step d., comprises treating said dispersion of solid sample in said extractor with a fluid in a critical state without any entrainer fluid added thereto until the organic dispersion fluid is substantially completely removed from said dispersion of solid sample in said extractor and then recovering said solid sample from said extractor.

3. A process as defined in claim 2, wherein said supercritical fluid is carbon dioxide.

4. A process as defined in claim 3, wherein said dispersion is composed of a solid sample dispersed in an alcohol.

5. A process as defined in claim 1, wherein said entrainer fluid is an alcohol.

6. A process for extracting substances contained in a solid sample, which comprises:

a. preparing a dispersion of a solid sample to be treated in an organic dispersion fluid;
b. extracting undesirable components from said solid sample by treating said dispersion of solid sample in an extractor with an extracting fluid in a supercritical state while maintaining said solid sample in a dispersed state for a time necessary to obtain a desired extraction of undesirable substances from said sample; said solid sample being maintained in a dispersed state by continuously feeding an entrainer fluid with said extracting fluid to said extractor while treating said dispersion of solid sample with said extracting fluid in a supercritical state;
c. continuously draining said extracting fluid in a supercritical state containing dissolved undesirable components from said extractor while treating said dispersion of solid sample in said extractor by means of step b; and
d. after completion of the extraction treatment of said dispersion of solid sample, feeding said extracting fluid in a supercritical state into said dispersion of solid sample without an entrainer fluid added therewith, draining said organic dispersion fluid from said dispersion of solid sample and recovering said solid sample from said extractor.

7. The process as defined in claim 6, wherein step b. said extracting fluid in a supercritical state includes said entrainer fluid admixed therewith.

8. A process as defined in claims 6 or 7 wherein said extracting fluid in a supercritical state is carbon dioxide.

9. A process as defined in claims 6 or 7, wherein said dispersion of a solid sample in an organic dispersion fluid is composed of a solid sample dispersed in an alcohol.

10. A process as defined in claim 9 wherein said alcohol is ethanol.

11. A process as defined in claim 6, wherein said solid sample is an extract from ginkgo leaves.

12. A process as defined in claim 11 wherein said entrainer fluid is an alcohol.

13. A process as defined in claim 12, wherein said fluid in a supercritical state is heated to about 70° C.

* * * * *

UNITED STATES PATENT AND TRADEMARK OFFICE
CERTIFICATE OF CORRECTION

PATENT NO. : 5,178,735
DATED : January 12, 1993
INVENTOR(S) : Akiyoshi Manabe, et al.

It is certified that error appears in the above-indentified patent and that said Letters Patent is hereby corrected as shown below:

On the title page, item (75) Inventor should read --Katsuhisa Harda, Higashi--,

Signed and Sealed this

Ninth Day of November, 1993

Attest:

BRUCE LEHMAN

*Attesting Officer*     Commissioner of Patents and Trademarks